United States Patent
Dixon

[15] 3,648,775
[45] Mar. 14, 1972

[54] CHROMIC ACID INJECTION FOR WELL STIMULATION

[72] Inventor: William H. Dixon, Littleton, Colo.
[73] Assignee: Marathon Oil Company, Findlay, Ohio
[22] Filed: July 6, 1970
[21] Appl. No.: 52,768

[52] U.S. Cl.................................166/307, 166/271, 166/273
[51] Int. Cl.................................................E21b 43/27
[58] Field of Search.....................166/268, 271, 273–275, 166/300, 304, 305 R, 307, 311, 312; 252/8.55 B, 8.55 C, 8.55 E

[56] References Cited

UNITED STATES PATENTS

| | | | |
|---|---|---|---|
| 3,493,049 | 2/1970 | Matthews et al.............. | 166/271 X |
| 2,094,479 | 9/1937 | Vandergrift................... | 166/271 UX |
| 3,537,523 | 11/1970 | Gogarty et al................ | 166/305 R |
| 1,608,869 | 11/1926 | Tilton........................... | 166/304 X |
| 2,204,224 | 6/1940 | Limerick et al............... | 166/307 UX |
| 2,356,205 | 8/1944 | Blair et al..................... | 166/307 UX |
| 2,885,004 | 5/1959 | Perry............................ | 166/271 X |

OTHER PUBLICATIONS

Condensed Chemical Dictionary. N.Y., Rheinhold, 6th Ed., 1961. pp. 272, 273.

*Primary Examiner*—Stephen J. Novosad
*Attorney*—Joseph C. Herring, Richard C. Willson, Jr. and Jack L. Hummel

[57] ABSTRACT

The relative permeability to the flow of water in a reservoir having substantially most of the mobile oil removed therefrom is improved by contacting the reservoir with an aqueous solution of chromic acid. Such is especially useful to increase the injectivity index of stimulation wells, e.g., during a waterflooding process, or following a miscible or miscible-like flooding process. Such is very useful in reservoirs characteristic of a hydrocarbon or hydrocarbon-like coating on the reservoir rock.

12 Claims, No Drawings

CHROMIC ACID INJECTION FOR WELL STIMULATION

BACKGROUND OF THE INVENTION

1. Field of the Invention

This invention relates to increasing the injectivity index of injection wells, specifically increasing the relative permeability to the flow of water.

2. Description of the Prior Art

U.S. Pat. No. 1,608,869 to Tilton teaches removing paraffin from a well bore by first removing naturally occurring liquids from the well, introducing an acid, e.g., sulfuric acid, and a water-soluble dichromate into the well and then removing dissolved paraffin from the well. Most of the paraffin is removed by heat generated by the reaction of acid and water. The potassium dichromate in the acid acts to dissolve the final film of paraffin adhering to mineral matter in the well.

U.S. Pat. No. 1,806,499 teaches facilitating the flow of hydrocarbon from wells by treating the well with an acid capable of evolving a large amount of heat upon mixing with water. Also, a gas-generating chemical is incorporated with the acid, the chemical preferably producing a gas soluble in oil. Examples of the gas-generating chemicals include calcium carbide and aluminum carbide. Examples of acid include hydrochloric acid and nitric acid.

U.S. Pat. No. 3,467,188 teaches stimulating injection wells with oil-external micellar dispersions.

U.S. Pat. No. 3,254,714 to Gogarty et al. teaches the use of micellar solutions to recover crude oil from subterranean reservoirs. Such is effected by injecting the micellar solution through an injection means and displacing the micellar solution through the reservoir to a production means in fluid communication with the reservoir. The micellar solution can be displaced by a water drive or optionally a mobility buffer (i.e., contains a mobility reducing agent) and a water drive or hydrocarbon drive.

SUMMARY OF THE INVENTION

Applicant has discovered a novel process of increasing the relative permeability to the flow of water in a reservoir having substantially all of the mobile oil removed therefrom. This is effected by treating the formation with about 10 percent to about 64 percent by weight of $CrO_3$ dissolved in an aqueous medium. Such is useful to increase the injectivity index of injection wells, thereby increasing the injection rates of secondary and tertiary recovery methods, etc.

DESCRIPTION OF PREFERRED EMBODIMENTS

Certain sandstones in the Appalachian Basin, e.g., the Bradford Third Sand, are characteristic of having a hydrocarbon coating on the sand grains. Such decreases the specific and relative permeability to the flow of water and gives the reservoir rock an oil-wet characteristic. This adversely influences waterflooding or any process wherein an aqueous drive is injected into the reservoir rock.

By injecting an aqueous solution of chromic acid into the reservoir, this adversity can be overcome. Visual inspection of a reservoir flooded with the aqueous chromic acid solution indicates that the dark residue coating the sand grains is removed. Also, the removal of the residue does not obstruct injection rates within the reservoir. However, the mobile oil must be substantially removed from the reservoir rock before it is treated with the aqueous chromic acid solution since the chromic acid tends to react with the mobile oil before coming in contact with the dark residue coating the sand grains.

Concentrations less than about 5 to about 64 percent, by weight, of chromic acid in an aqueous medium and preferably about 10 to about 50 percent are useful with the invention. More preferably, the concentration is at least about 20 percent. With concentrations in excess of 20 percent, a cross section of reservoir rock indicates a very distinct removal of the dark residue and a very light texture to a core sample. At concentrations of 10 percent chromic acid, there is a visual change of the dark color of the reservoir rock to a lighter color, thus indicating removal of the hydrocarbon coating.

Volume amounts of about 0.2 to about 500 gallons or more of the chromic acid solution per vertical foot of reservoir sandstone are useful with this invention.

Other additives may be incorporated within the aqueous solution containing the chromic acid. Such additives may be useful to impart desired characteristics that are particular to the reservoir and are desired by the particular operator of the reservoir. For example, corrosion inhibitors, surfactants, de-emulsifiers, etc. can be added.

This invention is especially useful to improve the injectivity index of a well. For example, in waterflooding a reservoir, an aqueous slug containing chromic acid can be injected behind the water and an increase in injectivity index is realized. In some cases, waterflooding has been unsuccessful in Appalachian Basin reservoirs due to the decreased relative permeability to the flow of water—by injecting aqueous slugs of chromic acid behind a water front, successful injection rates can be realized in such reservoirs to make it economically feasible to waterflood.

Also, in miscible and miscible-type flooding processes, such as surfactant flooding and especially emulsion and micellar dispersion flooding, an aqueous slug(s) of chromic acid behind the displacing agent or behind a mobility buffer or behind a drive or displacing slug is useful to increase the injection rates. Example of volume amounts of displacing agents, e.g., micellar dispersions, include 1–500 gallons of micellar dispersion per vertical foot of reservoir—after injection of the dispersion the chromic acid solution can be injected or a slug of water, about equal in volume to the micellar dispersion, can be injected after the dispersion and before the chromic acid solutions. With increased injection rates, an earlier payout or quicker return on investment can be realized. For example, a micellar dispersion slug can be injected, followed by a mobility buffer, and this in turn followed by an aqueous slug containing the chromic acid or by a displacing agent such as water and this in turn followed by the aqueous slug containing chromic acid. Such will increase the injectivity index and thereafter a drive material such as water can be injected to realize higher injection rates and an earlier pay-out in the secondary or tertiary recovery of crude oil.

As mentioned earlier, this particular invention increases the injectivity index of injection wells wherein substantially all of the mobile oil has been removed from the reservoir.

The aqueous solution containing the chromic acid can be preheated before it is injected or it can be heated as it goes down the well bore. Such is useful to increase the effectiveness of the chromic acid to remove the hydrocarbon residue from the sand grains. Also, sequential slugging of aqueous solutions containing the chromic acid can be used with the invention. That is, a small aqueous slug of chromic acid can be injected followed by a slug(s) of water and then slug(s) of aqueous solution containing chromic acid, etc. Also, the chromic acid can be injected by pulsing the pressure during the injection of the chromic acid solution through the reservoir. Such may be helpful in particular reservoirs to "work" the aqueous solution of chromic acid into the pores to more effectively remove the dark residue. Other methods commonly used and known to the oil industry can be used to more effectively utilize the chromic acid solution to increase the relative permeability to the flow of water.

In addition, the chromic acid can be permitted to remain in contact with the reservoir rock to more effectively "work" on the rock. Contact times of about one-half hour and even up to eight hours or more are useful.

The following example is presented to more specifically teach the embodiments of the invention. Unless otherwise specified, percents are based on volume:

EXAMPLE I

One inch core samples taken from the Bradford Third Sand in Pennsylvania are tested for their permeability. The core samples are then treated with an aqueous solution containing the indicated amounts of chromic acid (see Table 1).

Thereafter, the air permeability of the cores is determined at 100 p.s.i.g. Table 1 indicates the permeabilities before and after acid treatment, etc.

TABLE 1

| Core Sample | % H$_2$CrO$_4$ in Tap Water | K(md) to air Before Acid Treatment | After Acid Treatment |
|---|---|---|---|
| 1 | 40% | 32.8 | 53.9 |
| 2 | 40% | 136.2 | 314.0 |
| 3 | 40% | 73.1 | 121.7 |

The above data clearly shows that the use of chromic acid improves the relative permeability to the flow of air.

What is claimed is:

1. A process of increasing the relative permeability to the flow of water of an injection means in fluid communication with an oil-bearing reservoir having substantially all of the mobile oil removed from the immediate vicinity of the injection well, the process comprising injecting into the reservoir rock an aqueous solution containing chromic acid.

2. The process of claim 1 wherein the aqueous solution contains about 5 to about 64 percent by weight of chromic acid.

3. The process of claim 1 wherein the aqueous solution contains about 10 to about 50 percent by weight chromic acid.

4. The process of claim 1 wherein the aqueous solution contains at least about 20 percent by weight chromic acid.

5. The process of claim 1 wherein a miscible or miscible-type displacement slug is injected into the reservoir rock before the aqueous chromic acid solution is injected.

6. A method of increasing the injectivity index of an injection well in fluid communication with an oil-bearing reservoir wherein substantially all of the mobile oil is removed from the reservoir and the reservoir is characteristic of one containing a hydrocarbon coating on sand particles within the reservoir which adversely affects the relative permeability to the flow of water, the process comprising contacting the reservoir with an aqueous solution containing about 10 to about 50 percent by weight of chromic acid.

7. The method of claim 6 wherein the reservoir is contacted with a micellar dispersion before being contacted with the aqueous solution containing the chromic acid.

8. The method of increasing the injectivity index of injection wells in fluid communication with an oil-bearing reservoir, the method comprising:
  1. injecting into the reservoir about 1 to about 500 gallons of a micellar dispersion per vertical foot of reservoir,
  2. then injecting into the reservoir about 0.2 to about 500 gallons of aqueous chromic acid solution per vertical foot of reservoir, and
  3. thereafter injecting water into the reservoir.

9. The method of claim 8 wherein the aqueous solution containing chromic acid is at a concentration of about 5 to about 64 percent by weight of CrO$_3$.

10. The method of claim 8 wherein the aqueous solution containing the chromic acid is at a concentration of about 10 to about 50 percent by weight of CrO$_3$.

11. The method of claim 8 wherein an aqueous slug is injected after the micellar solution and before the chromic acid solution.

12. The method of claim 8 wherein the aqueous chromic acid solution is permitted to remain in contact with the reservoir rock for at least about 30 minutes before the water is injected.

* * * * *

UNITED STATES PATENT OFFICE
CERTIFICATE OF CORRECTION

Patent No. 3,648,775   Dated March 14, 1972

Inventor(s)   William H. Dixon

It is certified that error appears in the above-identified patent and that said Letters Patent are hereby corrected as shown below:

Please correct Table to read as shown below:

TABLE 1

| Core Sample | % $H_2CrO_4$ in Tap Water | K(md) to air Before Acid Treatment | K(md) to air After Acid Treatment |
|---|---|---|---|
| 1 | 40% | 32.8 | 53.9 |
| 2 | 40% | 136.2 | 314.0 |
| 3 | 40% | 73.1 | 121.7 |

Signed and sealed this 15th day of August 1972.

(SEAL)
Attest:

EDWARD M. FLETCHER, JR.
Attesting Officer

ROBERT GOTTSCHALK
Commissioner of Patents